W. C. TURNER.
WATER WHEEL.
APPLICATION FILED OCT. 30, 1909.

980,708.

Patented Jan. 3, 1911.
2 SHEETS—SHEET 2.

Witnesses
Frank Hough
Wm. Bagger

Inventor
William C. Turner,
By Victor J. Evans
Attorney

UNITED STATES PATENT OFFICE.

WILLIAM C. TURNER, OF CASEY, ILLINOIS.

WATER-WHEEL.

980,708.  Specification of Letters Patent.  Patented Jan. 3, 1911.

Application filed October 30, 1909. Serial No. 525,501.

*To all whom it may concern:*

Be it known that I, WILLIAM C. TURNER, a citizen of the United States of America, residing at Casey, in the county of Clark and State of Illinois, have invented new and useful Improvements in Water-Wheels, of which the following is a specification.

This invention relates to water wheels, and it has for its object to provide a water wheel of simple and improved construction equipped with feathering paddles, whereby it may be utilized as a current motor.

A further object of the invention is to construct a water wheel of the class described which by certain obvious changes in the construction thereof may be utilized as a propeller.

A still further object of the invention is to provide a simple and improved mechanism for feathering the paddles.

Still further objects of the invention are to simplify and improve the general construction and operation of a water wheel of the character described.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the invention may be resorted to when desired.

Figure 1:
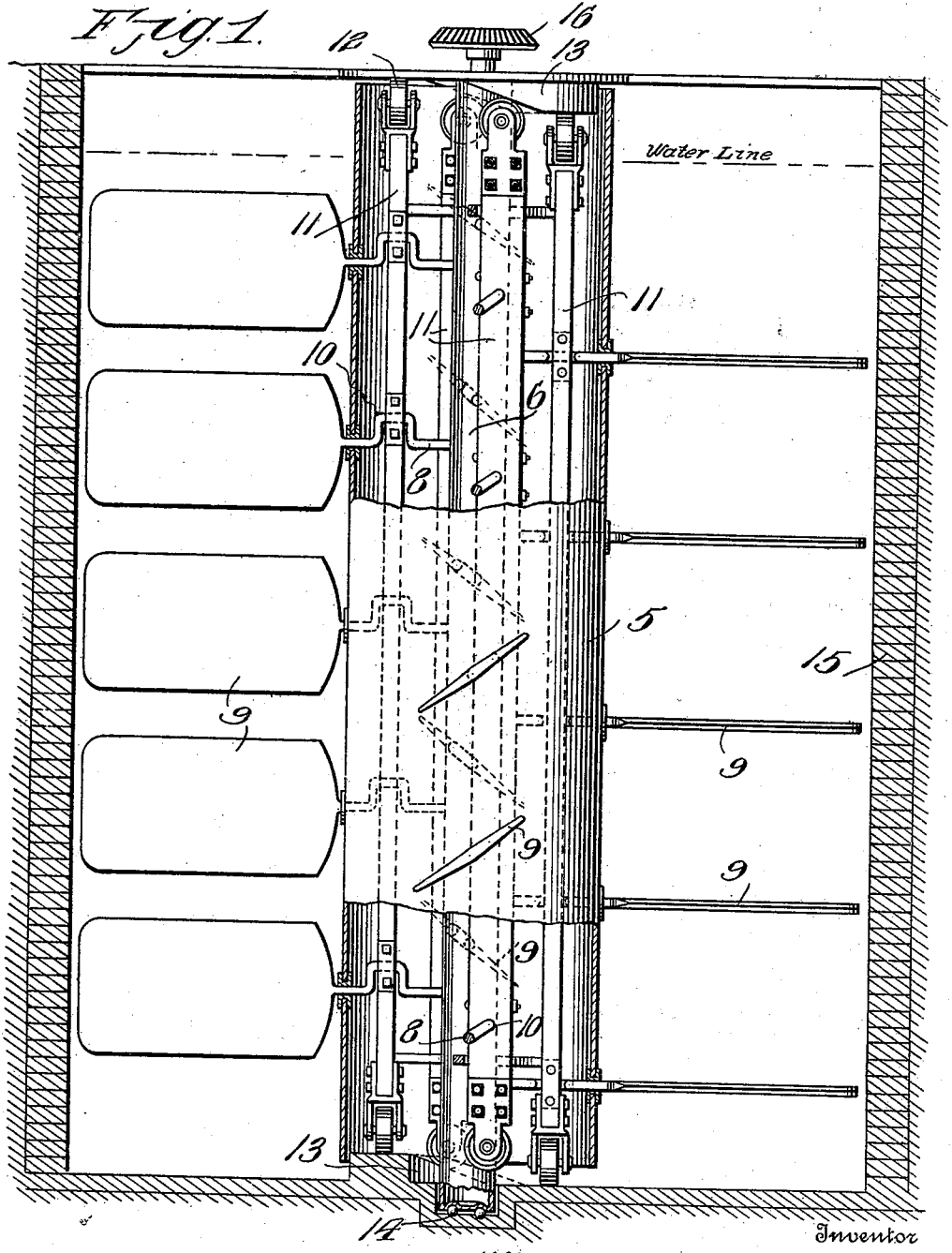
Figure 2:
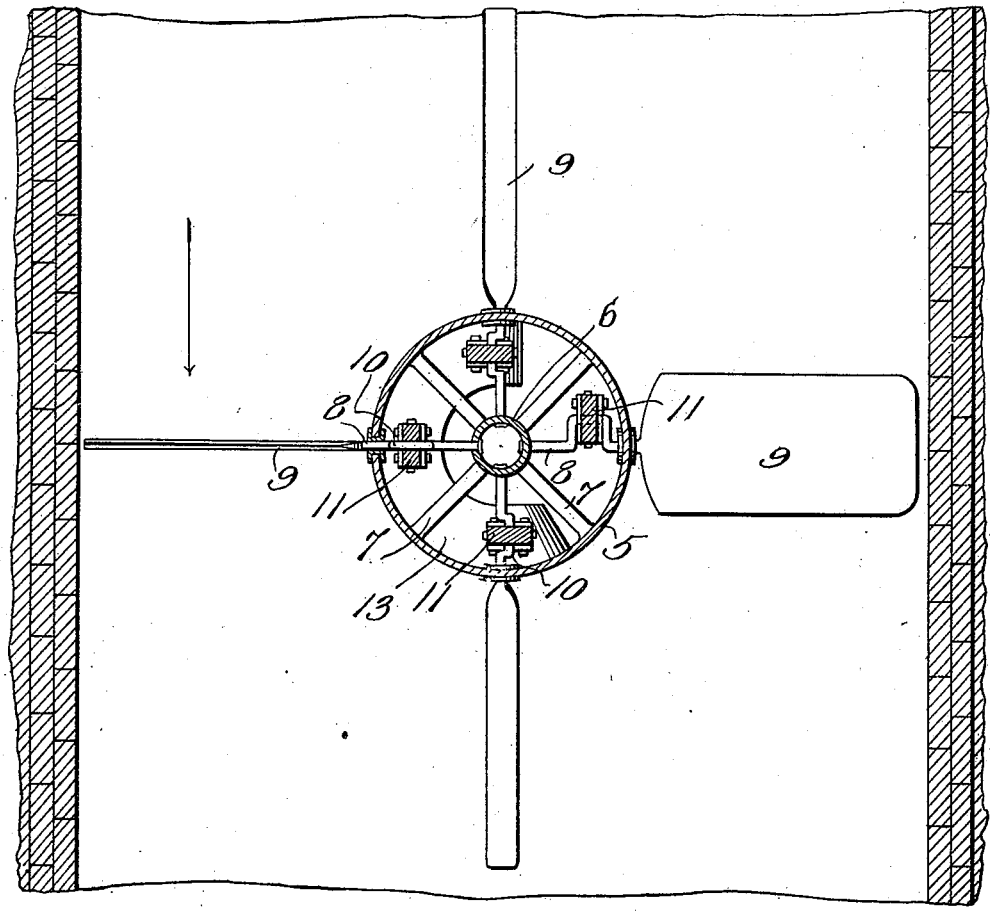
Figure 3:
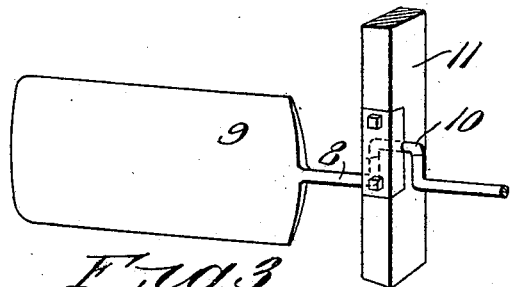

In the drawings,—Figure 1 is a sectional elevation of a water wheel constructed in accordance with the invention. Fig. 2 is a horizontal sectional view of the same. Fig. 3 is a perspective detail view of one of the paddles and a portion of a connecting rod.

Corresponding parts in the several figures are denoted by like characters of reference.

The hub of the improved water whel consists of a cylindrical casing 5 which may be constructed of sheet metal or other suitable material, the same being connected with the shaft 6 by means of arms or brackets 7. A tubular shaft may be used, as shown in Fig. 2, but this is not essential.

The hub 5 and the shaft 6 are provided with bearings for a plurality of crank shafts 8 of which four series arranged equidistantly and circumferentially have been shown, each series comprising a plurality of shafts which are arranged to break joints with those in the remaining series. These crank shafts which project through the cylindrical hub casing 5 are provided at their outer extremities with paddles 9. The cranks 10 of the shafts 8 in each series are connected by a rod 11 which is substantially parallel to the axis of the main shaft 6. These connecting rods are provided at the ends thereof with suitably supported wheels or pulleys 12 riding upon tracks 13 which are suitably supported adjacent to the ends of the main shaft, said tracks consisting each of a segmental flange having beveled ends, said tracks or flanges being disposed at diametrically opposite sides of the shaft, and the beveled ends of said tracks or flanges being in approximately parallel relation. The main shaft 6 may be supported by ball bearings or anti-friction bearings 14 at one or both ends.

Assuming the main shaft to be disposed in a vertical position, as indicated in Fig. 1 of the drawings, it will be seen that the connecting rods 11 will have a vertical reciprocatory movement when the shaft carrying the hub is rotated, said connecting rods being guided between the track flanges 13 adjacent to their upper and lower ends. The connection of the rods 11 with the cranks 10, and the relative arrangement of the parts, is such that the paddles carried by the shafts 8 at diametrically opposite sides of the main shaft, will be disposed in planes at right angles to each other; in other words, when the paddles at one side are disposed in a vertical plane, the paddles at the opposite side of the shaft will be disposed in horizontal planes, while the paddles of the two intermediate series will be disposed in inclined planes, substantially at right angles to each other. The bearings for the ends of the main shaft may be arranged in any suitable manner, whereby they will be held relatively stationary. In the drawings a casing 15 has been shown to afford bearings for the shaft and supporting means for the track flanges 13, but this construction may be modified when desired. In the drawings the upper end of the main shaft has also been shown provided with a beveled gear 16 for the transmission of motion, but any other suitable and well known means may be substituted therefor.

As illustrated in the accompanying drawings, the improved water wheel is adapted to be utilized in a vertical position as a current motor by arranging the casing in a stream where the vertically disposed paddles will be subjected to the action of the current, it being evident that the resistance of the horizontally disposed, as well as the inclined paddles, will be more than overcome by the power derived from the vertically disposed paddles which receive the impact of the current. As the wheel rotates, the position of the paddles in the four series is gradually shifted, those which travel into the path of the current gradually assuming the vertical position, while those traveling away from the path of the current gradually pass through various degrees of inclination until they assume the horizontal when the opposite side is reached. It will thus be readily seen that the entire wheel will be forcibly rotated and that the power gained therefrom may be transmitted and utilized in any suitable and well known manner.

The cylindrical hub or casing 5 of this device serves not only in connection with the shaft 6 to afford ample bearings for the paddle carrying crank shafts, enabling the latter and the paddles to be firmly supported, but it also constitutes a housing for the rods, whereby the crank shafts are serially connected and also serves to deflect the water in the direction of the paddles. This is specially important when the device is used as a current motor and more particularly under circumstances where a flume is used to direct the water to the wheel, since it prevents the waste or excessive use of water which in the absence of said casing would flow through the space between the paddles at opposite sides of the wheel.

It will also be noted that by arranging the track flanges adjacent to opposite ends of the main shaft of the device, the connecting rods 11 whereby the paddles are feathered will receive a positive end thrust in the proper direction as the wheel rotates.

The wheel may be utilized in a horizontal position, as will be readily understood. When thus utilized it will preferably be arranged in such a manner that it will be supported partly above the water level so that only those paddles which are exposed broadside to the action of the current will be submerged, thus avoiding loss of power from resistance. It will also be understood that the principle of construction herein described may be applied to a propeller wheel with equally satisfactory and useful results.

Having thus described the invention, what is claimed as new, is:—

1. In a device of the character described, a main shaft supported for rotation, a hub consisting of a cylindrical casing connected with said shaft, a plurality of series of crank shafts supported for rotation by said shaft and hub, said crank shafts being radially disposed and the several series being arranged circumferentially and equidistantly with relation to the shaft and the hub, paddles upon the outer ends of the shafts, rods connecting the crank shafts in series, said rods being approximately parallel to the axis of the main shaft, anti-friction members upon the ends of the connecting rods, and track flanges supported adjacent to the ends of the main shaft, said track flanges being disposed at diametrically opposite sides of the shaft and having inclined ends, the inclined ends of said track flanges being in approximately parallel relation.

2. In a device of the character described, a casing, a main shaft supported for rotation therein, track flanges supported adjacent to the ends of the main shaft at diametrically opposite sides of the latter and having inclined ends disposed in parallel relation, a cylindrical hub surrounding and connected with the main shaft, paddle-carrying crank shafts supported for rotation in the hub and in the main shaft, said crank shafts being disposed in equidistant series, and rods connecting said crank shafts and having terminal anti-friction members riding upon the track flanges.

In testimony whereof I affix my signature in presence of two witnesses.

WILLIAM C. TURNER.

Witnesses:
B. F. PARKER,
JOHN J. ARNEY.